April 2, 1929.   A. B. CLARK   1,707,785
SPEED CHANGE GEAR
Filed Nov. 30, 1927   4 Sheets-Sheet 1

Inventor,
Albert B. Clark;
By A. B. Upham,
Attorney.

April 2, 1929.  A. B. CLARK  1,707,785
SPEED CHANGE GEAR
Filed Nov. 30, 1927   4 Sheets-Sheet 2

Inventor,
Albert B. Clark;
By A. B. Upham,
Attorney.

April 2, 1929.  A. B. CLARK  1,707,785
SPEED CHANGE GEAR
Filed Nov. 30, 1927  4 Sheets-Sheet 3
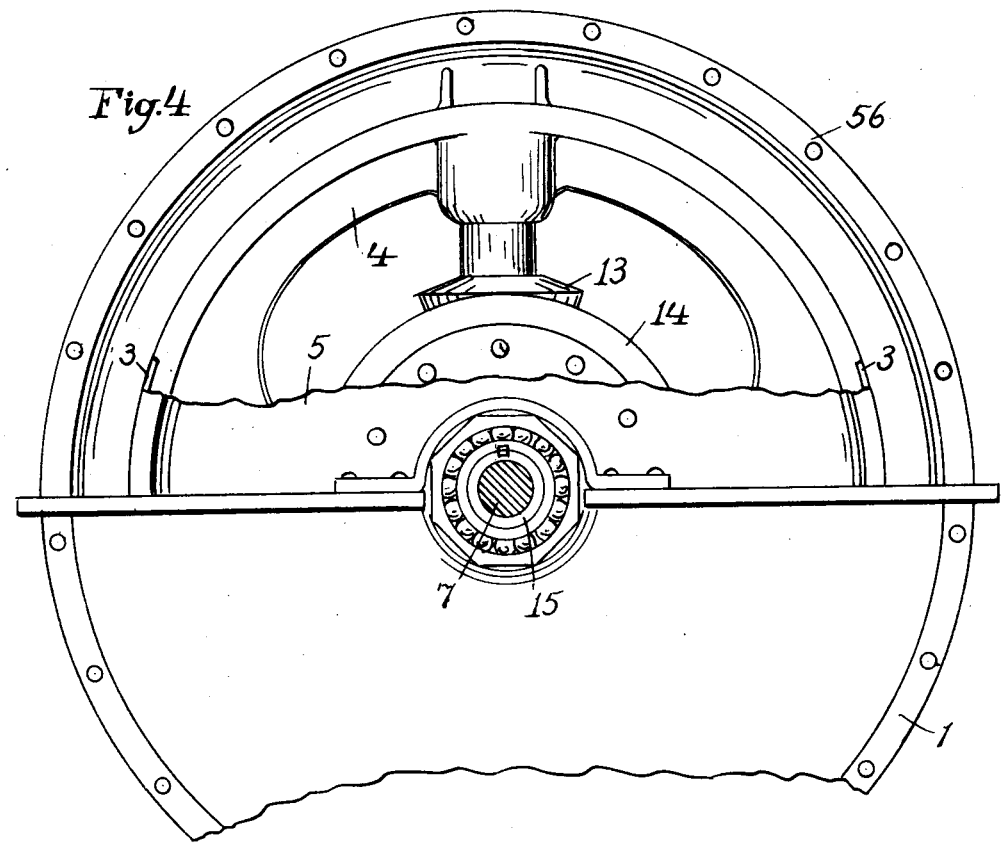
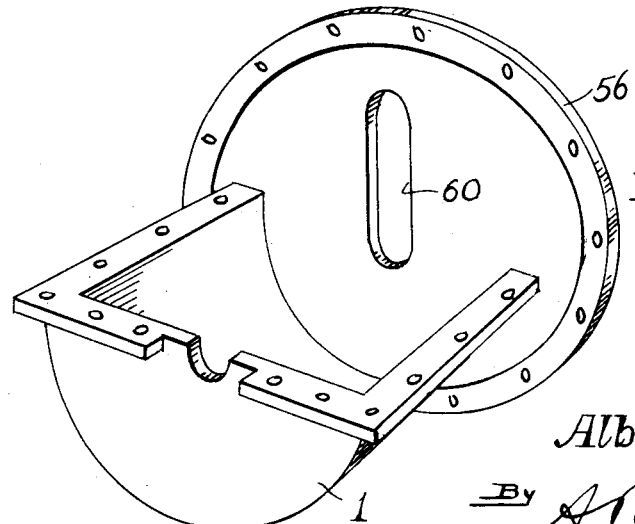
Inventor,
Albert B. Clark;
By A. B. Upham,
Attorney.

April 2, 1929.   A. B. CLARK   1,707,785
SPEED CHANGE GEAR
Filed Nov. 30, 1927   4 Sheets-Sheet 4

Inventor,
Albert B. Clark;
By A. B. Upham,
Attorney.

Patented Apr. 2, 1929.

1,707,785

UNITED STATES PATENT OFFICE.

ALBERT B. CLARK, OF BOSTON, MASSACHUSETTS.

SPEED-CHANGE GEAR.

Application filed November 30, 1927. Serial No. 236,861.

The object of this invention is the construction of a power control and speed change gear adapted to be under the control of a single pedal; and also of a simplified arrangement of the gearing and of the gear casing.

Figure 1:
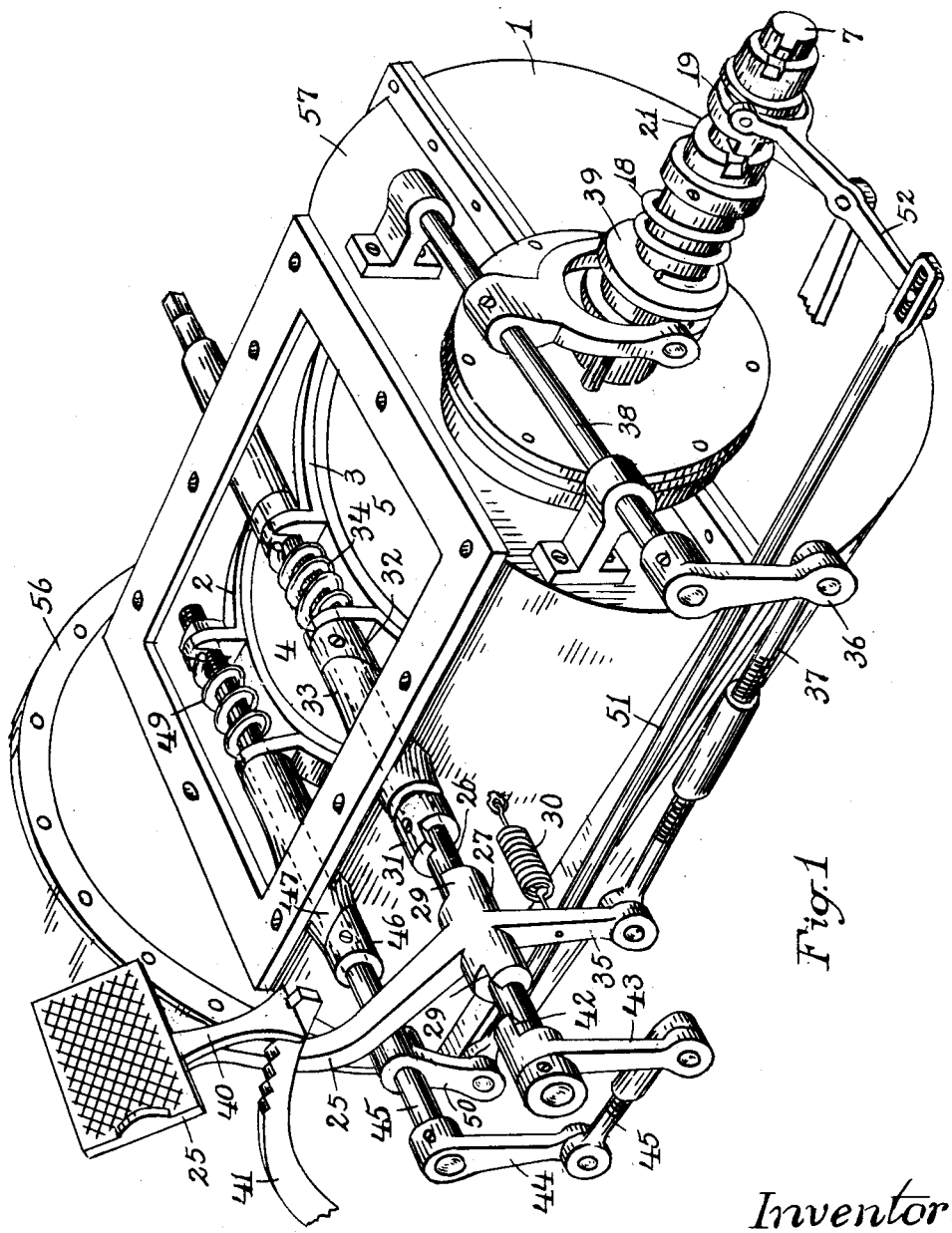
Figure 2:
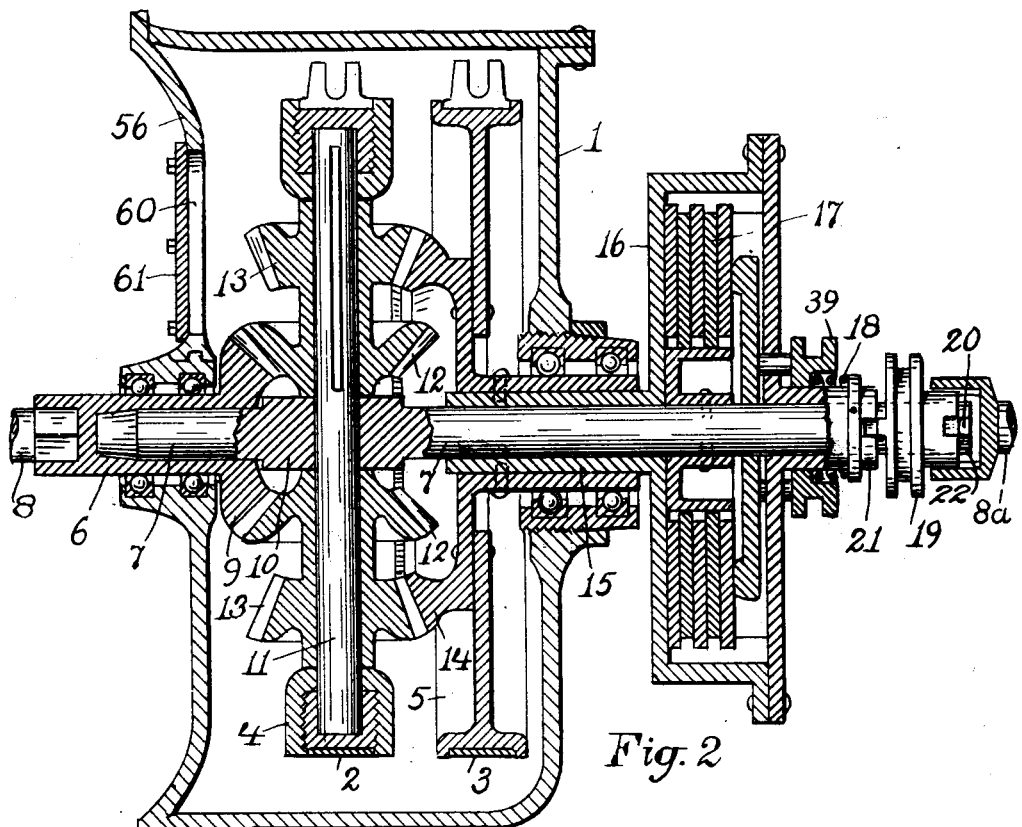
Figure 3:
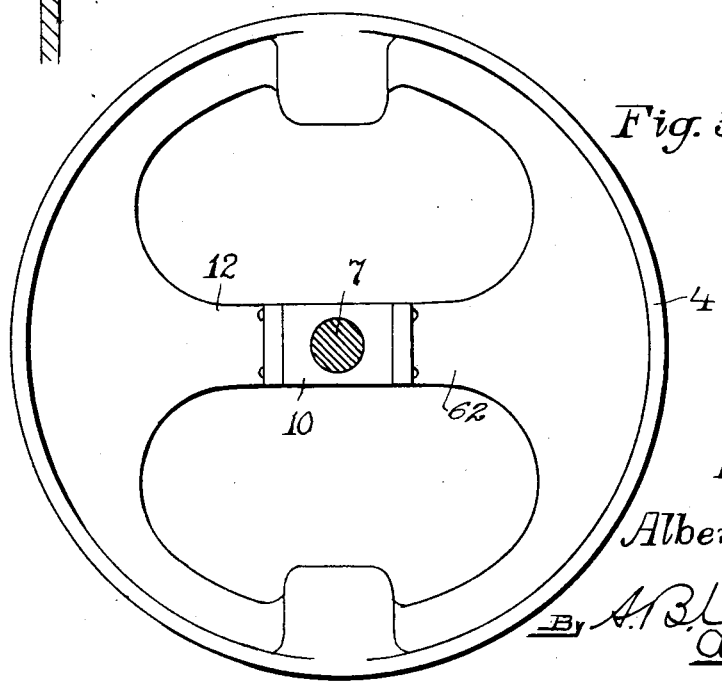
Figure 6:
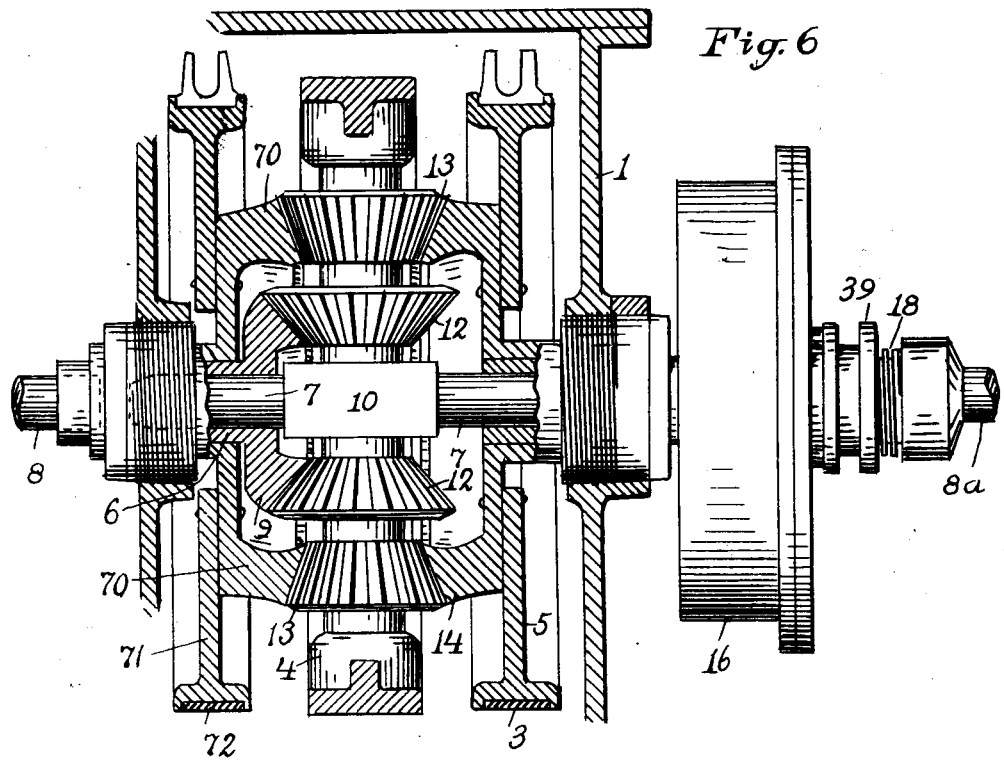
Figure 7:
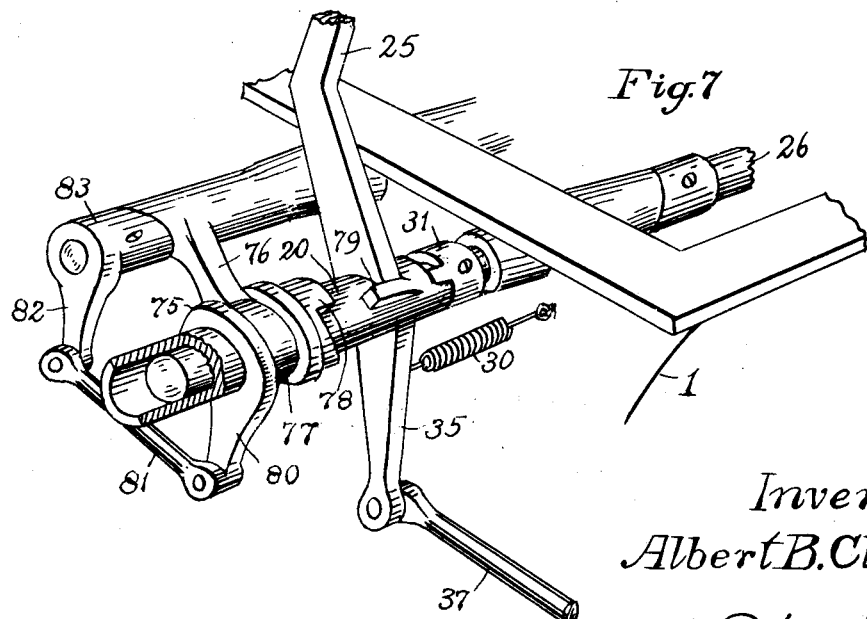

In the drawings forming part of this specification, Fig. 1 is a perspective view of the gear casing and connected parts, showing the control lever. Fig. 2 is a longitudinal section of the change gears and variable friction means. Fig. 3 is a face view of the main gear-carrying member. Fig. 4 is a face view, with parts broken away, of the gear case and parts within. Fig. 5 is a perspective view on a smaller scale of the main portion of the gear casing. Fig. 6 is a sectional view of a modification. Fig. 7 is a perspective view of a modification.

As shown in Fig. 1, the gear casing 1 has its top removed to disclose the clutch bands 2, 3 within encircling the respective circular members 4 and 5. Power from the engine is designed to be delivered to the sleeve 6 turning on a shaft 7 and having a bevel gear 9 formed or fixed upon its inner end. The shaft 7 is formed with a rectangular intermediate portion 10 through which passes a spindle 11 transverse to the shaft 7, and whose ends terminate in the annular member 4, the latter having radial projections 62 attached to the part 10.

Mounted on the spindle 11 at each side of the shaft 7 are two bevel gears 12, 13, rigidly connected, whether by being keyed on the spindle or by being made integral; the gear 12 being the larger and meshing with the gear 9. The gear 13 meshes with a large gear 14 rigid with a sleeve 15 which is loose on the shaft 7 but rigid with the chamber 16 containing friction disks 17. A helical spring 18 creates the desired friction between the disks 17, part of which turn with the chamber 16 and the others with the shaft 7. Upon the latter is a clutch member 19 adapted to be engaged with either the lug 20 projecting from the shaft 7, or with the sleeve 21 of the chamber.

The clutch member 19 being put into engagement with the lug 20, and the band 3 being tightened on the annulus 5, and the band 2 being loosened on the member 4, the shaft 7 will be rotated by the engine shaft 8 and in the same direction but with a slower speed, and likewise the driven shaft 8ª. Variation in this speed is obtained by loosening more or less the grip of the band 3 on the wheel 5.

For reversing the driven shaft, the clutch member 19 is engaged with the sleeve 21; the band 2 is tightened on the annulus 4, and the band 3 loosened on the member 5. The driving shaft 8 as it turns the sleeve 6 and gear 9, will, through the gears 12 and 13 rotate the large gear 14 at a slow speed and in a reverse direction. This rotates the chamber 16 and consequently the sleeve 21, the clutch member 19 and the driven shaft 22.

For the control of the above-described parts, a single pedal 25 is provided, as illustrated in Fig. 1, which is loosely mounted on a rod 26. The hub 27 of this pedal has a clutch-shoulder 29 at each end. Normally, as urged by a pull spring 30, the hub 27 is in clutch with a collar 31 fixed on the rod 26; and within the casing is a cam-shoulder 32 fixed on the rod and engaging a stationary cam-member 33. When the pedal is depressed, the cams 32, 33 compress the spring 34 and tighten the grip of the band 3 on the member 5. Simultaneously with this, through the agency of the arms 35, 36 and connecting rod 37, the member 39 is made to release the pressure of the spring 18 and the friction of the disks 17 (Fig. 2), thus communicating power to the driven shaft as above described. The pawl 40 by its engagement with the fixed notched bar 41, holds the parts at any desired point of adjustment, and at any desired speed between zero and full speed.

For reversing, the pedal is released from the member 31 and slid along the rod 26 until the clutch shoulder 29 of the hub 27 is clutched with the hub 42 of a lever-arm 43, and the pedal depressed. Through the arms 43, and 44 and a rod 45, the rod 46 is turned to cause its cam-shoulder 46 by its engagement with the fixed cam 47 to compress the spring 49 and tighten the band 2 on the annulus 4. Simultaneously, through the agency of the parts 50, 51, 52, 53 and 54, the clutch member 19 is put into engagement with the sleeve 21, and the slow reversed speed is delivered to the driven shaft as above described.

As shown in Fig. 5, the gear case 1 has its lower section semicylindrical and provided with an enlarged circular head 56 which is designed to be bolted to the engine casing. Upon this lower section is bolted an upper portion 57, as illustrated in Fig. 1, open at its top and designed to be closed by a suitable cover not shown. Through the head 56 is a vertical slot 60 normally closed by a plate 61, as shown in Fig. 2, to enable the shaft to be lifted out from the casing.

In the modification illustrated in Fig. 6, the clutch mechanism 19 shown in Fig. 2 is dispensed with, and the reversal of the drive is accomplished by means of a large gear 70 rigid with the sleeve 6 and meshing with the gears 13; the gear 70 having a disk 71 fixed thereto which bears a friction band 72. For reversing the direction, the band 72 is tightened and the band 3 loosened, thereby causing the annulus 4 to turn in the reverse direction and at a slow speed because of the relatively smaller size of the gear 13 as compared with the gear 12. For going ahead, the band 3 is tightened and the band 72 loosened, thereby causing the mechanism to operate as previously described.

In the modification illustrated in Fig. 7, the hub 20 of the pedal 25 is prolonged in order to prevent danger of cramping, and to render the construction more compact. Upon this extended hub is loosely mounted a sleeve 75 retained in place longitudinally by an arm 76 reaching into the groove 77; this sleeve having a projection 78 designed to be engaged by the lug 79 of the hub 20 when the pedal is pressed laterally toward it. This sleeve has an arm 80 joined by a rod 81 to an arm 82 projecting from the sleeve 83 fixed on the rod 45 (Fig. 1). The operation is the same as in the construction previously described.

The control mechanism shown may be used in connection with other pedal operated transmissions which utilize forward and reverse control bands. The reversing mechanism may be used in connection with planetary gears without altering the general construction. This gear device may be used as the basis for a three speed system of transmission. I do not restrict myself to any particular means for operating the band brakes, although I have illustrated mechanical means for the purpose.

What I claim as my invention is:

1. In a speed change gear comprising a power shaft, a gear turning therewith, an intermediate shaft, a propeller shaft, all in substantial alinement, a large gear loose on said intermediate shaft, a member rigidly mounted on said intermediate shaft, two rigidly united pinions rotatably carried by said member on a radially disposed axis, one of which pinions meshes with the first-named gear and the other with said large gear, a variable resistance element connected with said large gear and with said intermediate shaft, means for clutching said propeller shaft to either said large gear or to said intermediate shaft, means for holding said large gear stationary at will, and means operative when the propeller shaft is put into clutch with said large gear to hold said intermediate shaft stationary at will; a construction wherein said propeller shaft has an intermediate enlargement, and in which said radially disposed axis consists of a shaft passing through said enlargement transversely to said intermediate shaft.

2. A speed change gear as set forth in claim 1, wherein said member is an annulus having centrally projecting parts attached to said enlargement.

In testimony that I claim the foregoing invention, I have hereunto set my hand this 15th day of November, 1927.

ALBERT B. CLARK.